(12) United States Patent
Hoshina et al.

(10) Patent No.: US 9,929,434 B2
(45) Date of Patent: Mar. 27, 2018

(54) LITHIUM-ION CONDUCTIVE SULFIDE, SOLID ELECTROLYTE SECONDARY BATTERY AND BATTERY PACK

(71) Applicant: KABUSHIKI KAISHA TOSHIBA, Minato-ku, Tokyo (JP)

(72) Inventors: Keigo Hoshina, Yokohama (JP); Hiroki Inagaki, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/447,347

(22) Filed: Mar. 2, 2017

(65) Prior Publication Data

US 2017/0179523 A1    Jun. 22, 2017

Related U.S. Application Data

(63) Continuation of application No. 14/209,611, filed on Mar. 13, 2014, now Pat. No. 9,620,813, which is a
(Continued)

(51) Int. Cl.
*H01M 10/0562* (2010.01)
*H01M 10/052* (2010.01)
(Continued)

(52) U.S. Cl.
CPC ......... *H01M 10/0562* (2013.01); *C01B 17/20* (2013.01); *C01B 17/22* (2013.01);
(Continued)

(58) Field of Classification Search
CPC .............. C01B 17/22; H01M 10/0561; H01M 2300/0065
See application file for complete search history.

(56) References Cited

U.S. PATENT DOCUMENTS

| 6,322,929 B1 | 11/2001 | Takada et al. |
| 2005/0107239 A1 | 5/2005 | Akiba et al. |

(Continued)

FOREIGN PATENT DOCUMENTS

| JP | 2002-109955 | 4/2002 |
| JP | 2009-093995 | 4/2009 |

(Continued)

OTHER PUBLICATIONS

International Search Report for PCT/JP2012/056934 dated Jun. 12, 2012, 7 pages.
(Continued)

*Primary Examiner* — Jeremiah R Smith
(74) *Attorney, Agent, or Firm* — Amin, Turocy & Watson LLP

(57) ABSTRACT

According to one embodiment, a solid electrolyte secondary battery includes a positive electrode containing an active material, a negative electrode containing an active material, and a solid electrolyte layer. The solid electrolyte layer includes a lithium-ion conductive sulfide containing at least one element selected from a group consisting of Al, Si, Fe, Ni, and Zr, the total content of the element in the lithium-ion conductive sulfide is 0.03% by mass or more and 0.3% by mass or less.

14 Claims, 3 Drawing Sheets

Related U.S. Application Data continuation of application No. PCT/JP2012/056934, filed on Mar. 16, 2012.

(51) Int. Cl.
| | |
|---|---|
| H01B 1/10 | (2006.01) |
| C01B 17/20 | (2006.01) |
| C01B 17/22 | (2006.01) |
| C01B 25/14 | (2006.01) |
| C01G 23/00 | (2006.01) |
| C01G 51/00 | (2006.01) |
| H01M 2/10 | (2006.01) |
| H01M 4/485 | (2010.01) |
| H01M 4/525 | (2010.01) |
| H01M 10/0525 | (2010.01) |
| H01M 10/42 | (2006.01) |
| H01M 10/0561 | (2010.01) |
| H01M 4/131 | (2010.01) |

(52) U.S. Cl.
CPC ............ *C01B 25/14* (2013.01); *C01G 23/005* (2013.01); *C01G 51/42* (2013.01); *H01B 1/10* (2013.01); *H01M 2/1077* (2013.01); *H01M 4/485* (2013.01); *H01M 4/525* (2013.01); *H01M 10/052* (2013.01); *H01M 10/0525* (2013.01); *H01M 10/425* (2013.01); *C01P 2002/50* (2013.01); *C01P 2002/54* (2013.01); *C01P 2006/40* (2013.01); *H01M 4/131* (2013.01); *H01M 10/0561* (2013.01); *H01M 2220/20* (2013.01); *H01M 2300/0065* (2013.01); *H01M 2300/0068* (2013.01); *Y02T 10/7011* (2013.01)

(56) References Cited

U.S. PATENT DOCUMENTS

| | | | | |
|---|---|---|---|---|
| 2008/0052900 | A1* | 3/2008 | Kondo | H01M 10/44 29/623.2 |
| 2008/0311480 | A1* | 12/2008 | Sano | H01M 4/13 429/322 |
| 2010/0151335 | A1 | 6/2010 | Senga et al. | |
| 2011/0033735 | A1* | 2/2011 | Kinoshita | H01M 10/052 429/90 |
| 2011/0076570 | A1 | 3/2011 | Hama et al. | |
| 2011/0171537 | A1* | 7/2011 | Takeuchi | C01B 17/22 429/322 |

FOREIGN PATENT DOCUMENTS

| | | |
|---|---|---|
| JP | 2011-044249 | 3/2011 |
| JP | 2011-060649 | 3/2011 |
| JP | 2011-181495 | 9/2011 |

OTHER PUBLICATIONS

Written Opinion for PCT/JP2012/056934 dated Jun. 12, 2012, 5 pages.

International Preliminary Report on Patentabililty for PCT/JP2012/056934 dated Sep. 25, 2014, 9 pages.

Non-Final Office Action for U.S. Appl. No. 14/209,611 dated Nov. 20, 2015, 20 pages.

Final Office Action for U.S. Appl. No. 14/209,611 dated May 25, 2016, 18 pages.

* cited by examiner

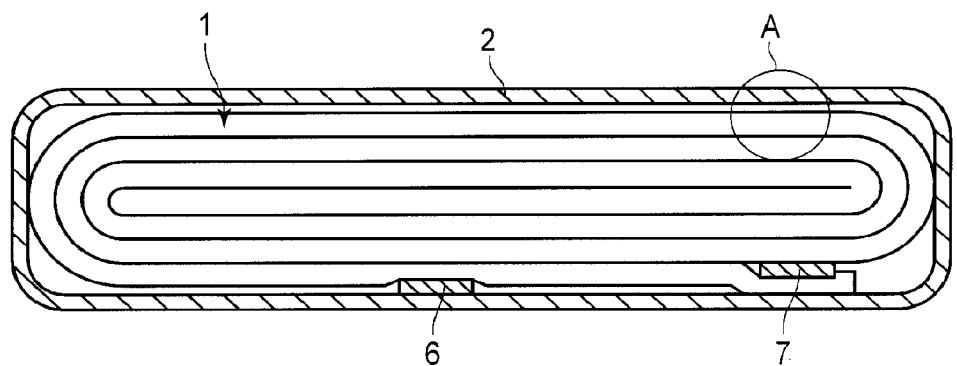
F I G. 1
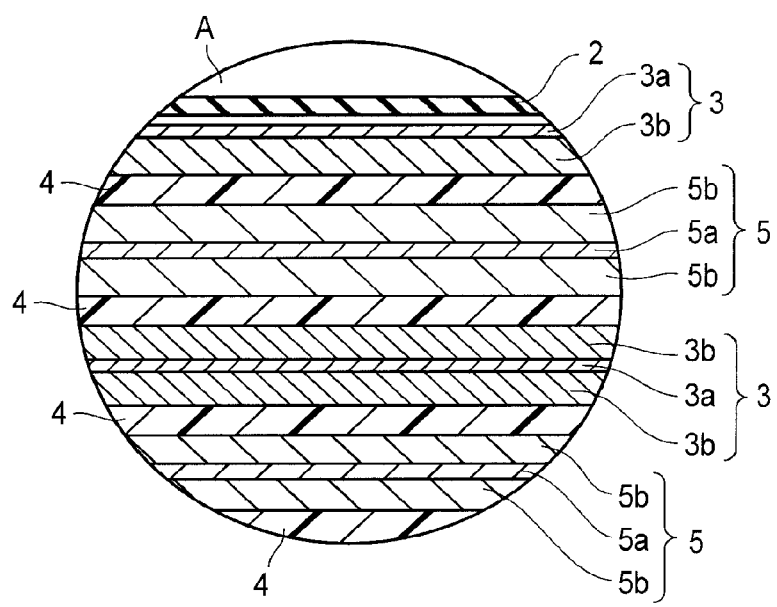
F I G. 2

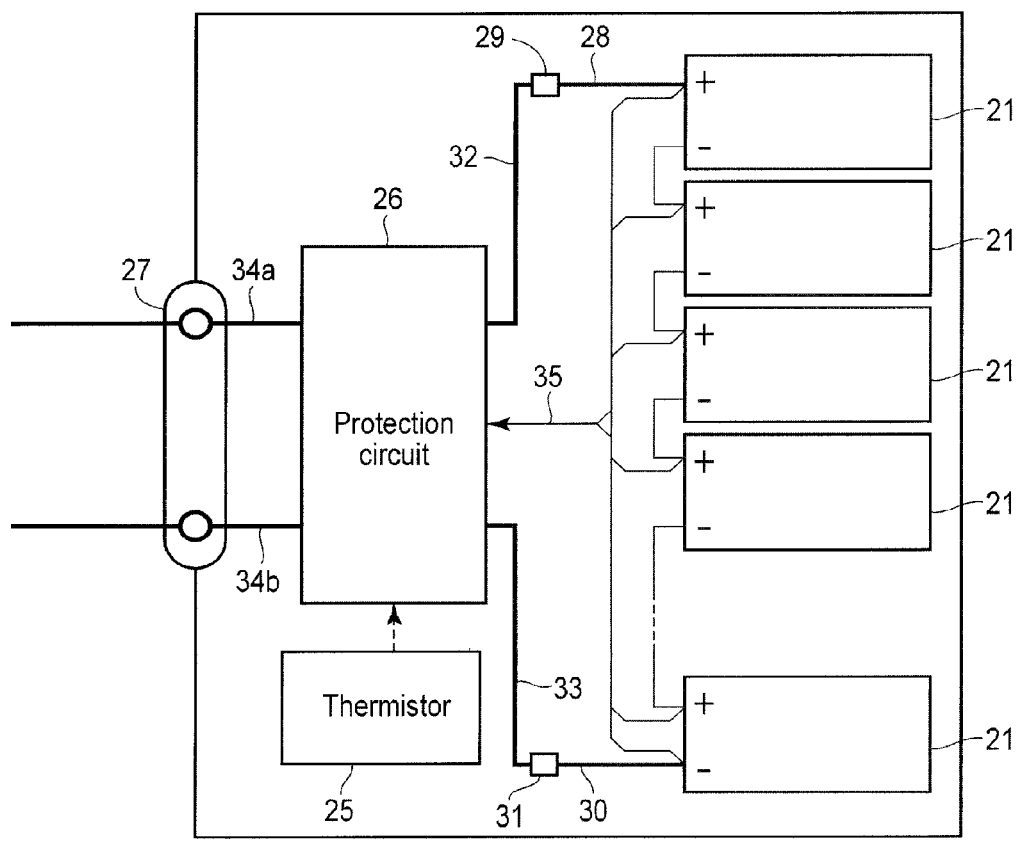
F I G. 4

LITHIUM-ION CONDUCTIVE SULFIDE, SOLID ELECTROLYTE SECONDARY BATTERY AND BATTERY PACK

CROSS REFERENCE TO RELATED APPLICATIONS

This application is a Continuation Application of application Ser. No. 14/209,611 filed on Mar. 13, 2014, which is a Continuation Application of PCT Application No. PCT/JP2012/056934, filed on Mar. 16, 2012, the entire contents of both of which are incorporated by reference.

FIELD

Embodiments described herein relate generally to a lithium-ion conductive sulfide, a solid electrolyte secondary battery, and a battery pack.

BACKGROUND

A lithium-ion secondary battery uses a lithium transition-metal oxide as an active material of a positive electrode, carbon as an active material of a negative electrode, and a non-aqueous electrolyte solution obtained by dissolving lithium salt in an organic solvent as an electrolyte. In recent years, such a lithium-ion secondary battery has been broadly used in small-sized devices such as portable telephones and notebook-type personal computers. An application of such a secondary battery to large-scale devices, e.g., to in-car power supplies for hybrid cars, plug-in hybrid cars, electric cars, and the like, and a fixed power supply for power storage or the like, has been considered.

When the common lithium-ion secondary battery is applied to large-sized equipment, it is important to increase the battery in safety. The lithium-ion secondary battery is likely to leak a liquid and generate gas because it employs a non-aqueous electrolyte solution.

BRIEF DESCRIPTION OF THE DRAWINGS

FIG. 1 is a cross-sectional view of a flat-shaped solid electrolyte secondary battery according to an embodiment.
FIG. 2 is an enlarged cross-sectional view of part A of FIG. 1.
FIG. 4 is a block diagram illustrating an electric circuit of the battery pack of FIG. 3.

DETAILED DESCRIPTION

Figure 3:
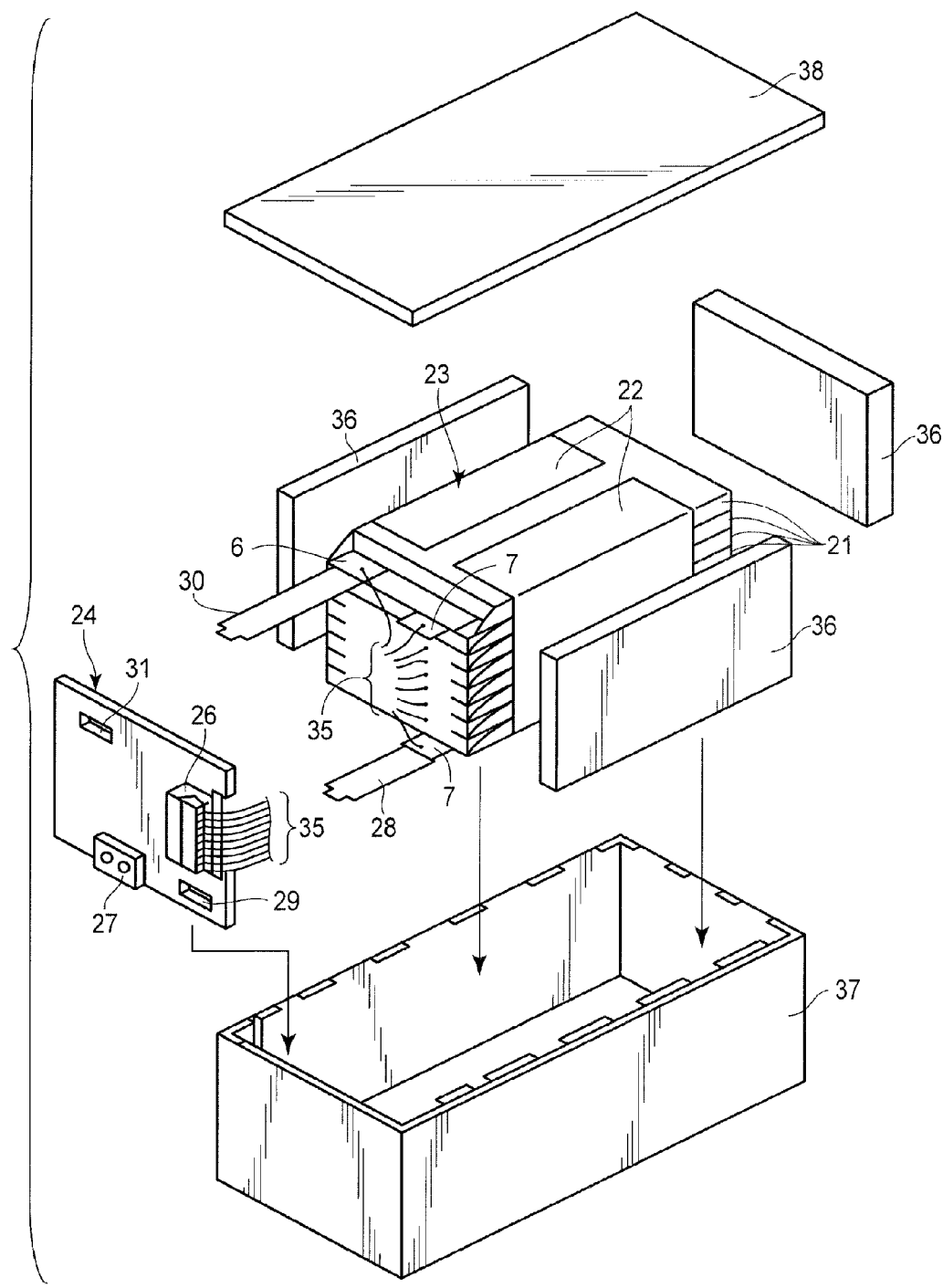
FIG. 3 is an exploded perspective view of a battery pack according to the embodiment.

Hereinafter, a lithium-ion conductive sulfide, a solid electrolyte secondary battery, and a battery pack according to the embodiment will be described in detail.

In general, a lithium-ion conductive sulfide according to embodiment includes at least one selected from a group consisting of Al, Si, Fe, Ni, and Zr, wherein the total content of the element in the lithium-ion conductive sulfide is 0.03% by mass or more and 0.3% by mass or less.

When the number of elements included in the lithium-ion conducting oxide is one, the "total amount of content of the element" means an amount of content of the one element. When the number of elements is two or more, the "total amount of content of the element" means an amount of content of the sum of the two or more elements.

Examples of the lithium-ion conductive sulfide include a compound expressed by $(1-x-y)$ $Li_2S.xGeS_2.yP_2S_5$, where x and y are $0 \leq x < 0.5$, $0 \leq y < 0.4$, respectively, THIO-LISICON, a sulfide referred to as sulfide glass ceramic, and compounds expressed by $(1-x)Li_2S-xB_2S_3$ and $(1-x)Li_2S-xGeS_2$, where x is $0.15 \leq x < 0.5$. The THIO-LISICON is preferably $Li_{4-x}Ge_{1-x}P_xS_4$, where x is $0.2 < x \leq 0.9$, for example. The sulfide glass ceramic is preferably $(1-x)Li_2S.xP_2S_5$, where x is $0.15 \leq x < 0.5$.

Of these lithium-ion conductive sulfides, THIO-LISICON and a sulfide referred to as sulfide glass ceramic is more preferable.

When the total content of the element in the lithium-ion conductive sulfide is out of the range of 0.03% by mass or more and 0.3% by mass or less, it is difficult to increase the lithium ion conductivity. More preferably, the total content of the element is 0.08% by mass or more and 0.15% by mass or less.

The lithium-ion conductive sulfide according to the embodiment can increase the lithium ion conductivity compared to a lithium-ion conductive sulfide not containing the element. Since the lithium-ion conductive sulfide contains at least one selected from a group consisting of Al, Si, Fe, Ni, and Zr, the total content of the element in the lithium-ion conductive sulfide being 0.03% by mass or more and 0.3% by mass or less, it is considered that lithium ions are easily conducted at between sulfide particles, although details are not clear.

Next, a solid electrolyte secondary battery according to the embodiment will be described.

In general, a solid electrolyte secondary battery comprises a positive electrode, a negative electrode, and a solid electrolyte layer, wherein the solid electrolyte layer comprises a solid electrolyte layer including at least one selected from a group consisting of Al, Si, Fe, Ni, and Zr, the total content of the element in the lithium-ion conductive sulfide being 0.03% by mass or more and 0.3% by mass or less.

The positive electrode, the negative electrode, and the solid electrolyte layer constituting the solid electrolyte secondary battery will now be described in detail.

1) Positive Electrode

A positive electrode comprises a current collector and a positive electrode layer formed on at least one surface of the current collector and containing an active material.

As the current collector, aluminum foil or aluminum alloy foil can be used. For example, the aluminum foil or the aluminum alloy foil contains at least one element selected from a group consisting of Mg, Ti, Zn, Mn, Fe, Cu, and Si.

A variety of oxides can be used as the active material.

Examples of the oxides include a lithium cobalt composite oxide (such as $Li_xCoO_2$), a lithium nickel composite oxide (such as $Li_xNiO_2$), a lithium nickel cobalt composite oxide (such as $LiNi_{1-y}Co_yO_2$), a lithium manganese cobalt composite oxide (such as $Li_xMn_yCo_{1-y}O_2$), a lithium nickel cobalt manganese composite oxide (such as $LiNi_{1-y-z}Co_yMn_zO_2$), a lithium nickel cobalt aluminum composite oxide (such as $LiNi_{1-y-z}Co_yAl_zO_2$), a lithium manganese composite oxide having a spinel structure (such as $Li_xMn_2O_4$), a lithium manganese nickel composite oxide having a spinel structure (such as $Li_xMn_{2-y}Ni_yO_4$), a lithium phosphorus oxide having an olivine structure (such as $Li_xFePO_4$, $Li_xFe_{1-y}Mn_yPO_4$, and $Li_xCoPO_4$), and a vanadium oxide (such as $V_2O_5$). The variables x, y, and z is preferably satisfied the following relations: $0 < x \leq 1$, $0 \leq y \leq 1$, $0 \leq z \leq 1$.

The active material can use the above-described compounds either in a single form or in a mixture form.

It is preferable that the active material has a high positive electrode voltage. Examples of such an active material include a lithium manganese composite oxide ($Li_xMn_2O_4$), a lithium manganese nickel composite oxide having a spinel structure ($Li_xMn_{2-y}Ni_yO_4$), a lithium nickel composite oxide ($Li_xNiO_2$), a lithium cobalt composite oxide ($Li_xCoO_2$), a lithium nickel cobalt composite oxide ($LiNi_{1-y}Co_yO_2$), a lithium manganese cobalt composite oxide ($Li_xMn_yCo_{1-y}O_2$), a lithium nickel cobalt manganese composite oxide (such as $LiNi_{1-y-z}Co_yMn_zO_2$), and lithium iron phosphate ($Li_xFePO_4$). The variables x, y, and z are preferably satisfied the following relations: $0<x\leq1$, $0\leq y\leq1$, $0\leq z\leq1$.

The positive electrode layer may comprise a conductive agent, a binder, and a lithium-ion conductive sulfide including the above-mentioned total content of at least one element selected from a group consisting of Al, Si, Fe, Ni, and Zr, as well as the active material.

The conductive agent increases the current collection properties, and reduces the contact resistance between the active material and the current collector. Examples of the conductive agent include carbonaceous materials, such as acetylene black, carbon black, graphite, carbon nano fiber and carbon nanotube.

The binder improves binding between the active material and the conductive agent with the current collector. Examples of the binder include lithium-ion conductive polymers such as polytetrafluoroethylene (PTFE), a polyvinylidene fluoride, a fluorine-based rubber, and a polyethylene oxide containing lithium salt.

The lithium-ion conductive sulfide increases the lithium ion conductivity between the positive electrode layer and the solid electrolyte layer.

The incorporation ratio of the active material, the conductive agent, the binder and the lithium-ion conductive sulfide including the above-mentioned total content of the element is preferably adjusted to 50% by mass or more and 95% by mass or less of the active material, 2% by mass or more and 30% by mass or less of the conductive agent, 2% by mass or more and 20% by mass or more of the binder, and 10% by mass or more and 30% by mass or less of the lithium-ion conductive sulfide.

The conductive agent exhibits the above-described effect at an amount of 2% by mass or more. The conductive agent achieves both energy density and high conductivity at an amount of 30% by mass or less.

The binder achieves a sufficient intensity for the positive electrode at an amount of 2% by mass or more. The binder can decrease the content of the binder as an insulating material in the positive electrode at an amount of 20% by mass or less, thereby reducing the internal resistance.

The lithium-ion conductive sulfide can improve the lithium ion conductivity in the positive electrode layer at an amount of 10% by mass or more. The lithium-ion conductive sulfide achieves both high energy density and high lithium ion conductivity at an amount of 30% by mass or less.

A positive electrode can be produced using a technique that will be described below, for example. Slurry is prepared by suspending an active material, a conductive agent, and a binder in a solvent. The slurry is applied on one surface or both surfaces of a current collector and allowed to dry, thereby forming a positive electrode layer. The obtained positive electrode layer is pressed. It is also possible to produce a positive electrode by molding an active material, a conductive agent, and a binder in a pellet form so as to form a positive electrode layer, and providing the positive electrode layer on one surface or both surfaces of a current collector.

2) Negative Electrode

A negative electrode comprises a current collector and a negative electrode layer formed on at least one surface of the current collector and containing an active material.

As the current collector, aluminum foil, aluminum alloy foil, or copper foil ca be used. In particular, aluminum foil or aluminum alloy foil containing an element such as Mg, Ti, Zn, Mn, Fe, Cu, and Si is preferable.

Examples of the active material include a metal sulfide, a metal oxide, carbon, and an alloy.

Examples of the metal sulfide include a titanium sulfide, and an iron sulfide. A preferable metal sulfide is an iron sulfide.

Examples of the metal oxide include a titanium composite oxide, a niobium composite oxide, a silicon composite oxide, and an iron oxide. A preferable metal oxide is a titanium composite oxide, and more preferable metal oxide is spinel-type lithium titanate.

Examples of the carbon include graphite and hard carbon. The alloy is preferably an alloy of Li and at least one metal selected from a group consisting of Si, Al, Sn, and In.

The negative electrode layer may comprise a conductive agent, a binder, and a lithium-ion conductive sulfide including the above-mentioned total content of at least one element selected from the group consisting of Al, Si, Fe, Ni, and Zr, as well as the active material.

The conductive agent increases the current collection properties, and reduces the contact resistance between the active material and the current collector. Examples of the conductive agent include carbonaceous materials, such as acetylene black, carbon black, graphite, carbon nano fiber, and carbon nanotube.

The binder improves binding between the active material and the conductive agent with the current collector. Examples of the binder include lithium-ion conductive polymers such as polytetrafluoroethylene (PTFE), a polyvinylidene fluoride, a fluorine-based rubber, and a polyethylene oxide containing lithium salt.

The lithium-ion conductive sulfide including the above-mentioned total content of the element increases lithium ion conductivity between the negative electrode layer and the solid electrolyte layer. The lithium-ion conductive sulfide, for example, can be used the compound described above.

The incorporation ratio of the active material, the conductive agent, the binder and the lithium-ion conductive sulfide containing a specific content of the element is preferably adjusted to 50% by mass or more and 96% by mass or less of the active material, 2% by mass or more and 30% by mass or less of the conductive agent, 2% by mass or more and 30% by mass or more of the binder, and 10% by mass or more and 30% by mass or less of the lithium-ion conductive sulfide.

When the conductive agent is contained in an amount of less than 2% by mass, the current collection properties of the negative electrode layer deteriorate to cause deterioration in large current properties of the solid electrolyte secondary battery. When the binder is contained in an amount of less than 2% by mass, the binding properties between the active material layer and the current collector deteriorate to cause deterioration in cycle properties. From the viewpoint of achieving high capacitance, on the other hand, each of the conductive agent, the binder, and the lithium-ion conductive sulfide is preferably contained in an amount of 30% by mass or less.

A negative electrode can be produced using a technique that will be described below, for example. Slurry is prepared by suspending an active material, a conductive agent, and a binder in a solvent. The slurry is applied on one surface or both surfaces of a current collector and allowed to dry, thereby forming a negative electrode layer. The obtained negative electrode layer is pressed. It is also possible to produce a negative electrode by molding an active material, a conductive agent, and a binder in a pellet form so as to form a negative electrode layer, and providing the negative electrode layer on one surface or both surfaces of a current collector.

3) Solid Electrolyte Layer A solid electrolyte comprises a lithium-ion conductive sulfide containing at least one selected from a group consisting of Al, Si, Fe, Ni, and Zr. The total content of the elements in the lithium-ion conductive sulfide is 0.03% by mass or more and 0.3% by mass or less.

Examples of the lithium-ion conductive sulfide include a compound expressed by $(1-x-y)Li_2S.xGeS_2.yP_2S_5$, where x and y are $0 \leq x < 0.5$, $0 \leq y < 0.4$, respectively, THIO-LISICON, a sulfide referred to as sulfide glass ceramic, and compounds expressed by $(1-x)Li_2S-xB_2S_3$ and $(1-x)Li_2S-xGeS_2$, where x is $0.15 \leq x < 0.5$. The THIO-LISICON should preferably be $Li_{4-x}Ge_{1-x}P_xS_4$, where x is $0.2 < x \leq 0.9$, for example. The sulfide glass ceramic is preferably $(1-x)Li_2S.xP_2S_5$, where x is $0.15 \leq x < 0.5$.

Of these lithium-ion conductive sulfides, THIO-LISICON and a sulfide referred to as sulfide glass ceramic are more preferable.

When the total content of the element contained in the lithium-ion conductive sulfide is out of the range of 0.03% by mass or more and 0.3% by mass or less, it is difficult to increase lithium-ion conductivity. More preferably, the total content of the element in the lithium-ion conductive sulfide is 0.08% by mass or more and 1.5% by mass or less.

A solid electrolyte layer may comprise a plurality of lithium-ion conductive sulfides including the above-mentioned total content of the element.

A solid electrolyte layer can be produced on a positive electrode layer or a negative electrode layer by an application technique or the like. For example, a solid electrolyte layer can be produced on a positive electrode layer described below. That is, preparing slurry by dispersing a lithium-ion conductive sulfide containing a specific total content of the element and the binder in a solvent, and applying the slurry on a positive electrode layer and then allowing the slurry to dry. It is also possible to produce a solid electrolyte layer by sintering a lithium-ion conductive sulfide including the above-mentioned total content of the element.

Next, the solid electrolyte secondary battery according to the embodiment will be described in more detail with reference to FIGS. 1 and 2. FIG. 1 is a cross-sectional view of a flat-shaped solid electrolyte secondary battery according to the embodiment, and FIG. 2 illustrates an expanded cross-sectional view of part A of FIG. 1. Since the drawings are schematic views for illustrating the invention and promoting understanding thereof, shapes, dimensions, ratios, and the like shown in the drawings may be different from those of the actual devices, and may be designed and changed as appropriate in consideration of the description that will be given below and publicly-known techniques.

A flat-shaped wound electrode group 1 is housed in a sac-like exterior container 2 made of a laminated film in which a metal layer is interposed between two resin films. The flat-shaped wound electrode group 1 is formed by winding a stacked object obtained by stacking a negative electrode 3, a solid electrolyte layer 4, a positive electrode 5, and a solid electrolyte layer 4 in this order in a spiral manner from the outside, and press-molding the stacked object.

The negative electrode 3 located at the outermost surface has a structure in which a negative electrode layer 3b contained an active material is formed on an inner surface side of a current collector 3a, as shown in FIG. 2. The other negative electrode 3 is configured to form a negative electrode layer 3b on both surfaces of a current collector 3a. The negative electrode layer 3b may comprise a conductive agent, a binder, and a lithium-ion conductive sulfide including the above-mentioned total content of at least one element selected from the group consisting of Al, Si, Fe, Ni, and Zr, as well as the active material.

The positive electrode 5 is configured to form a positive electrode layer 5b on both surfaces of a current collector 5a. The positive electrode layer 5b may comprise a conductive agent, a binder, and a lithium-ion conductive sulfide containing at least one element selected from the group consisting of Al, Si, Fe, Ni, and Zr, as well as the active material. The solid electrolyte layer 4 is interposed between the negative electrode layer 3b of the negative electrode 3 and the positive electrode layer 5b of the positive electrode 5.

In the vicinity of a circumferential edge of the would electrode group 1, a negative electrode terminal 6 is connected to the current collector 3a of the negative electrode 3 at the outermost surface, and a positive electrode terminal 7 is connected to the current collector 5a of the inner positive electrode 5. The negative electrode terminal 6 and the positive electrode terminal 7 extend toward the outside from an opening of the sac-like exterior container 2. By heat-sealing the opening of the sac-like exterior container 2 in which the negative electrode terminal 6 and the positive electrode terminal 7 are inserted, the wound electrode group 1 is completely sealed in the exterior container 2.

The negative electrode terminal can be formed of a material having a potential of 0.4 V vs. lithium metal or more and 3 V vs. lithium metal or less and having electrical safety and conductivity, as well as copper and stainless. Examples of such a material include an aluminum alloy containing an element such as Mg, Ti, Zn, Mn, Fe, Cu, or Si, and aluminum. In order to reduce the contact resistance, it is preferable to use a material similar to that of the current collector.

The positive electrode terminal can be formed of a material having a potential of 3 V vs. lithium metal or more and 5 V vs. lithium metal or less and having electrical safety and conductivity. Examples of such a material include an aluminum alloy containing an element such as Mg, Ti, Zn, Mn, Fe, Cu, or Si, and aluminum. In order to reduce the contact resistance, it is preferable to use a material similar to that of the current collector.

A flat-shaped solid electrolyte secondary battery has been described as an example of the solid electrolyte secondary battery according to the embodiment. The shape of the battery, however, is not limited to the flat shape and may be a square shape, a cylindrical shape, a coin shape, a button shape, a sheet shape, or a stacked shape. Further, the solid electrolyte secondary battery may be a large-scale battery mounted on a two-wheel or four-wheel vehicle, for example, as well as a small-scale battery mounted on a portable electronic device and the like.

The above-described solid electrolyte secondary battery, in which a solid electrolyte layer is made of a lithium-ion conductive sulfide containing at least one selected from a group consisting of Al, Si, Fe, Ni, and Zr, the total content of the element in the lithium-ion conductive sulfide being 0.03% by mass or more and 0.3% by mass or less, achieves improvement in input/output characteristics against a large current because of the high lithium ion conductivity of the lithium-ion conductive sulfide.

Next, a battery pack according to the embodiment will be described in detail below.

In general, the battery pack according to the embodiment comprises one or more solid electrolyte secondary battery (unit cell). When plurality of unit cells include, the unit cells are electrically connected in series, in parallel, or in series and in parallel.

The above battery pack according to this embodiment will be explained in detail with reference to FIGS. 3 and 4. The solid electrolyte secondary battery shown in FIG. 1 is used as the unit cell.

Plural unit cells 21 are laminated such that the externally extended negative electrode terminal 6 and positive electrode terminal 7 are arranged in the same direction and fastened with an adhesive tape 22 to thereby constitute a battery assembly 23. These unit cells 21 are electrically connected each other in series as shown in FIG. 4.

A print wiring board 24 is disposed opposite to the side surface of the unit cell 21 from which the negative electrode terminal 6 and positive electrode terminal 7 extend. As shown in FIG. 4, a thermistor 25, a protective circuit 26 and an energizing terminal 27 connected to external devices are mounted on the print wiring board 24. An insulating plate (not shown) is attached to the surface of the print wiring substrate 24 facing the battery assembly 23 to avoid unnecessary connection with the wiring of the battery assembly 23.

One of the ends of the positive electrode side lead 28 is connected with the positive electrode terminal 7 positioned on the lowermost layer of the battery assembly 23 and the other end is inserted into a positive electrode side connector 29 of the print wiring board 24 to be electrically connected with the print wiring board 24. One of the ends of the negative electrode side lead 30 is connected with the negative electrode terminal 6 positioned on the uppermost layer of the battery assembly 23 and the other end is inserted into a negative electrode side connector 31 of the print wiring board 24 to be electrically connected with the print wiring board 24. These connectors 29 and 31 are connected to the protective circuit 26 through wirings 32 and 33 formed on the print wiring board 24.

The thermistor 25 is used to detect the temperature of the unit cell 21 and the detection signals are transmitted to the protective circuit 26. The protective circuit 26 can shut off a plus side wiring 34a and minus side wiring 34b between the protective circuit 26 and the energizing terminal 27 connected to external devices under a predetermined condition. The predetermined condition means, for example, the case where the temperature detected by the thermistor 25 is above a predetermined one. Also, the predetermined condition means, for example, the case of detecting overcharge, overdischarge and over-current of the unit cell 21. The detection of this overcharge and the like is made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 3 and 4, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery assembly 23 other than the side surface from which the positive electrode terminal 7 and negative electrode terminal 6 are projected.

The battery assembly 23 is housed in a housing tank 37 together with each protective sheet 36 and print wiring board 24. Specifically, the protective sheet 36 is disposed on each inside surface in the direction of the long side and on one of the inside surfaces in the direction of the short side of the receiving tank 37, and the print wiring board 24 is disposed on the other inside surface in the direction of the short side. The battery assembly 23 is positioned in a space enclosed by the protective sheets 36 and the print wiring board 24. A lid 38 is attached to the upper surface of the receiving tank 37.

Here, a thermally contracting tape may be used in place of the adhesive tape 22 to secure the battery assembly 23. In this case, after the protective sheet is disposed on both sides of the battery assembly and the thermally contracting tapes are wound around the battery assembly, the thermally contracting tape is contracted by heating to fasten the battery assembly.

The structure in which the unit cells 21 are connected in series is shown in FIGS. 3 and 4. However, with regard to these unit cells 21, either parallel or series-parallel cell connections may be used to increase the capacity of the battery. The assembled battery packs may be further connected in series or parallel.

Also, the structure of the battery pack is appropriately changed according to its use. The battery pack is preferably used in applications exhibiting excellent cycle characteristics when a large current is extracted. Examples of these applications include power sources for digital cameras, and power sources mounted on vehicles such as two- to four-wheel hybrid electric cars, two- to four-wheel electric cars and assist bicycles. The battery pack is preferably used for power sources mounted on vehicles.

EXAMPLES

Descriptions will be given on examples, but the present invention should only fall within the scope of the invention and is not limited to examples that will be described herein.

Example 1

$Li_2S$, $GeS_2$, and $P_2S_5$ were weighted in an argon box so as to be contained at a predetermined ratio, and were mixed using an agate mortar. The mixture was subjected to a heat treatment under vacuum at 700° C. for the duration of 10 hours. The obtained $Li_{3.25}Ge_{0.25}P_{0.75}S_4$ and $SiS_2$ were mixed at a weight ratio of 100:1 in an argon box. The mixture was subjected to a heat treatment at 500° C. for the duration of two hours, thereby producing a lithium-ion conductive sulfide containing Si.

As a result of ICP (Inductively Coupled Plasma) analysis of Si contained in the obtained lithium-ion conductive sulfide, it was confirmed that 0.28% by mass of Si was contained.

Example 2

$Li_2S$ and $P_2S_5$ were weighed at a ratio of 75:25 in an argon box, and were mixed using an agate mortar. After that, a $0.75Li_2S$-$0.25P_2S_5$ mixture and $Al_2S_3$ were put in a zirconia container at a weight ratio of 200:1 together with zirconia balls, and were subjected to a ball mill treatment. The ball mill treatment was performed at 400 rpm for the duration of 24 hours, thereby producing a lithium-ion conductive sulfide containing Al.

As a result of ICP analysis of Al contained in the obtained lithium-ion conductive sulfide, it was confirmed that 0.16% by mass of Al was contained.

Example 3

A lithium-ion conductive sulfide containing Zr was obtained in an approach same as that of Example 2, except for that a $0.75Li_2S$-$0.25P_2S_5$ mixture and $ZrS_2$ were mixed at a weight ratio of 300:1.

As a result of ICP analysis of Zr contained in the obtained lithium-ion conductive sulfide, it was confirmed that 0.19% by mass of Zr was contained.

Example 4

A lithium-ion conductive sulfide containing Zr was obtained in an approach same as that of Example 2, except for that a $0.75Li_2S$-$0.25P_2S_5$ mixture and $ZrS_2$ were mixed at a weight ratio of 1200:1.

As a result of ICP analysis of Zr contained in the obtained lithium-ion conductive sulfide, it was confirmed that 0.045% by mass of Zr was contained.

Example 5

A lithium-ion conductive sulfide containing Ni was obtained in an approach same as that of Embodiment 2, except for that a $0.75Li_2S$-$0.25P_2S_5$ mixture and $Ni_3S_2$ were mixed at a mixture ratio of 500:1.

As a result of ICP analysis of Ni contained in the obtained lithium-ion conductive sulfide, it was confirmed that 0.14% by mass of Ni was contained.

Example 6

A lithium-ion conductive sulfide containing Fe was obtained in an approach same as that of Example 2, except for that a $0.75Li_2S$-$0.25P_2S_5$ mixture and FeS were mixed at a mixture ratio of 500:1.

As a result of ICP analysis of Fe contained in the obtained lithium-ion conductive sulfide, it was confirmed that 0.12% by mass of Fe was contained.

Comparative Example 1

$Li_2S$, $GeS_2$, and $P_2S_5$ were weighted in an argon box so as to be contained at a predetermined ratio, and were mixed using an agate mortar. The mixture was subjected to a heat treatment at 700° C. under vacuum for the duration of 10 hours, thereby producing a lithium-ion conductive sulfide ($Li_{3.25}Ge_{0.25}P_{0.75}S_4$).

Comparative Example 2

A lithium-ion conductive sulfide was obtained in an approach same as that of Example 2, except for that only $0.75Li_2S$-$0.25P_2S_5$ was put in a zirconia container together with zirconia balls and was subjected to a ball mill treatment.

Comparative Example 3

A lithium-ion conductive sulfide containing Zr was obtained in an approach same as that of Example 2, except for that a $0.75Li_2S$-$0.25P_2S_5$ mixture and $ZrS_2$ were mixed at a mixture ratio of 150:1.

As a result of ICP analysis of Zr contained in the obtained lithium-ion conductive sulfide, it was confirmed that as high as 0.38% by mass (higher than 0.3% by mass) of Zr was contained.

Comparative Example 4

A lithium-ion conductive sulfide containing Zr was obtained in an approach same as that of Example 2, except for that a $0.75Li_2S$-$0.25P_2S_5$ mixture and $ZrS_2$ were mixed at a weight ratio of 3000:1.

As a result of ICP analysis of Zr contained in the obtained lithium-ion conductive sulfide, it was confirmed that as low as 0.015% by mass (less than 0.03% by mass) of Zr was contained.

Powder of each of the obtained lithium-ion conductive sulfides of Examples 1-5 and Comparative Examples 1-4 was interposed by SUS (Steel Use Stainless) plates and pressed, and a lithium ion conductivity was calculated by an alternating-current impedance measurement technique. The results are shown in Table 1.

TABLE 1

| | Contained element: Content is given in Parenthesis (% by mass) | Lithium ion conductivity at 25° C. |
|---|---|---|
| Example 1 | Si (0.28) | $4.2 \times 10^{-4}$ Scm$^{-1}$ |
| Example 2 | Al (0.16) | $8.9 \times 10^{-4}$ Scm$^{-1}$ |
| Example 3 | Zr (0.19) | $7.5 \times 10^{-4}$ Scm$^{-1}$ |
| Example 4 | Zr (0.045) | $3.6 \times 10^{-4}$ Scm$^{-1}$ |
| Example 5 | Ni (0.14) | $6.6 \times 10^{-4}$ Scm$^{-1}$ |
| Example 6 | Fe (0.12) | $9.2 \times 10^{-4}$ Scm$^{-1}$ |
| Comparative Example 1 | — | $1.2 \times 10^{-4}$ S cm$^{-1}$ |
| Comparative Example 2 | — | $2.4 \times 10^{-4}$ Scm$^{-1}$ |
| Comparative Example 3 | Zr (0.38) | $9.1 \times 10^{-5}$ Scm$^{-1}$ |
| Comparative Example 4 | Zr (0.015) | $1.8 \times 10^{-4}$ Scm$^{-1}$ |

As clear from Table 1, the lithium-ion conductive sulfides according to Examples 1-5, which include the elements of Al, Si, Fe, Ni, and Zr, and in which a total content of the element is 0.03% by mass or more and 0.3% by mass or less, have improved ion conductivity compared to the lithium-ion conductive sulfides according to Comparative Examples 1-5 not containing the above-mentioned elements or containing the above-mentioned elements in a content out of the above-described range.

Example 7

<Production of Positive Electrode>

$LiCoO_2$, acetylene black, a polyvinylidene fluoride, and the $0.75Li_2S$-$0.25P_2S_5$ containing Zr obtained in Example 3 are mixed at a mass ratio of 50:15:10:25. The mixture was added to N-methylpyrrolidon (NMP) so as to prepare slurry. The slurry was applied to both surfaces of a current collector made of aluminum foil, allowed to dry, and then pressed, thereby producing a positive electrode including a positive electrode layer with the above-described composition.

<Production of Negative Electrode>

$Li_4Ti_5O_{12}$, acetylene black, a polyvinylidene fluoride, and the $0.75Li_2S$-$0.25P_2S_5$ containing Zr obtained in Example 3 were mixed at a mass ratio of 60:10:10:20. The mixture was added to N-methylpyrrolidon (NMP), and thereby slurry was prepared. The slurry was applied to both surfaces of a current collector formed of aluminum foil, allowed to dry, and then pressed, thereby producing a negative electrode including a negative electrode layer with the above-described composition.

<Production of Electrode Group>

The positive electrode, the solid electrolyte layer formed of the $0.75Li_2S$-$0.25P_2S_5$ containing Zr obtained in Example 3 and having a thickness of 20 μm, the negative electrode, and the solid electrolyte layer were stacked in this order, wound in a spiral manner, and then heat-pressed at 80° C., thereby producing a flat-shaped wound electrode group. The obtained wound electrode group was housed in a pack (exterior container) having a three-layer structure of a nylon layer, an aluminum layer, and a polyethylene layer and formed of a laminated film having a thickness of 0.1 mm, and was subjected to vacuum drying at 80° C. for the duration of 24 hours. After that, the pack was completely sealed with a heat seal, thereby producing a solid electrolyte secondary battery.

Example 8

A solid electrolyte secondary battery same as that of Example 7 was produced, except for that a positive electrode layer, a negative electrode layer, and a solid electrolyte layer contain $Li_{3.25}Ge_{0.25}P_{0.75}S_4$ containing Si obtained in Example 1 as a lithium-ion conductive sulfide.

Comparative Example 5

A solid electrolyte secondary battery same as that of Example 7 was produced, except for that a positive electrode layer, a negative electrode layer, and a solid electrolyte layer contain $0.75Li_2S$-$0.25P_2S_5$ obtained in Comparative Example 2 as a lithium-ion conductive sulfide.

Comparative Example 6

A solid electrolyte secondary battery same as that of Example 7 was produced, except for that a positive electrode layer, a negative electrode layer, and a solid electrolyte layer contain $0.75Li_2S$-$0.25P_2S_5$ containing Zr (0.38% by mass) obtained in Comparative Example 3 as a lithium-ion conductive sulfide.

Comparative Example 7

A solid electrolyte secondary battery same as that of Example 7 was produced, except for that a positive electrode layer, a negative electrode layer, and a solid electrolyte layer contain $0.75Li_2S$-$0.25P_2S_5$ containing Zr (0.015% by mass) obtained in Comparative Example 4 as a lithium-ion conductive sulfide.

The obtained solid electrolyte secondary batteries according to Examples 7 and 8 and Comparative Examples 5-7 were subjected to a charge/discharge test in an environment of 45° C. under the conditions that will be described below. The solid electrolyte secondary batteries were charged to 2.8 V at a rated current of 0.1 C rate, and then rated voltage charging was performed at 2.8 V. The charging time was 15 hours. In discharging, measurement was performed by varying the current rate. Discharging was performed at rated currents of 0.1 C and 0.5 C rate to 1.5 V. In the above-described charge/discharge test, the ratio of the discharge capacitance at 0.5 C to the discharge capacitance at 0.1 C [(0.5 C discharge capacitance/0.1 C discharge capacitance)× 100%] was determined. The results are shown in Table 2.

TABLE 2

| | (0.5° C. discharge capacitance/0.1° C. discharge capacitance) × 100(%) |
|---|---|
| Example 7 | 70 |
| Example 8 | 79 |
| Comparative Example 5 | 61 |
| Comparative Example 6 | 52 |
| Comparative Example 7 | 63 |

As clear from Table 2, in the solid electrolyte secondary battery according to Examples 7 and 8 comprising a solid electrolyte layer made of a lithium-ion conductive sulfide containing at least one element selected from a group consisting of Al, Si, Fe, Ni, and Zr, and a total content of the element being 0.03% by mass or more and 0.3% by mass or less, the ratio of the discharge capacitance at 0.5 C to the discharge capacitance at 0.1 C is high compared to the solid electrolyte secondary batteries according to Comparative Examples 5-7 which comprise a solid electrolyte layer made of a lithium-ion conductive sulfide not containing the above-described elements or containing the above-described elements in a content out of the above-described range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid electrolyte secondary battery comprising, a positive electrode, a negative electrode, and a solid electrolyte layer,
   wherein the negative electrode comprises a current collector and a negative electrode layer formed on at least one surface of the current collector and containing an active material, the active material being a titanium sulfide, an iron sulfide, a titanium composite oxide, a niobium composite oxide, a silicon composite oxide, an iron oxide, graphite, hard carbon, or an alloy which is Li and at least one metal selected from a group consisting of Si, Al, Sn, and In,
   the solid electrolyte layer comprises a lithium-ion conductive sulfide including at least one element selected from a group consisting of Fe, Ni, and Zr, and
   the total content of the at least one element in the lithium-ion conductive sulfide is 0.03% by mass or more and 0.3% by mass or less.

2. The solid electrolyte secondary battery of claim 1, wherein at least one selected from the positive electrode and the negative electrode comprises the lithium-ion conductive sulfide including at least one element selected from a group consisting of Al, Si, Fe, Ni, and Zr, the total content of the element in the lithium-ion conductive sulfide being 0.03% by mass or more and 0.3% by mass or less the element.

3. A battery pack comprising the solid electrolyte secondary battery according to claim 1.

4. The solid electrolyte secondary battery of claim 1, wherein the active material in the negative electrode is the titanium composite oxide, or the niobium composite oxide.

5. The solid electrolyte secondary battery of claim 1, wherein the negative electrode layer further comprises at least one of a conductive agent, a binder, and a lithium-ion conductive sulfide, the lithium-ion conductive sulfide including at least one element selected from a group consisting of Al, Si, Fe, Ni, and Zr, and the total content of the at least one element in the lithium-ion conductive sulfide being 0.03% by mass or more and 0.3% by mass or less.

6. The solid electrolyte secondary battery of claim 1, wherein the lithium-ion conductive sulfide is $(1-x-y)Li_2S \cdot xGeS_2 \cdot yP_2S_5$, where x and y are $0 \leq x < 0.5$, $0 \leq y < 0.4$, respectively.

7. The solid electrolyte secondary battery of claim 1, wherein the lithium-ion conductive sulfide is $Li_{4-x}Ge_{1-x}P_xS_4$, where x is $0.2 < x \leq 0.9$.

8. The solid electrolyte secondary battery of claim 1, wherein the lithium-ion conductive sulfide is $(1-x)Li_2S \cdot xP_2S_5$, where x is $0.15 \leq x < 0.5$.

9. The solid electrolyte secondary battery of claim 1, wherein the positive electrode comprises a current collector and a positive electrode layer formed on at least one surface of the current collector and containing an active material, the active material being a lithium cobalt composite oxide, a lithium nickel composite oxide, a lithium nickel cobalt composite oxide, a lithium manganese cobalt composite oxide, a lithium nickel cobalt manganese composite oxide, a lithium nickel cobalt aluminum composite oxide, a lithium manganese composite oxide having a spinel structure, a lithium manganese nickel composite oxide having a spinel structure, a lithium phosphorus oxide having an olivine structure, a vanadium oxide, or a mixture thereof.

10. The solid electrolyte secondary battery of claim 9, wherein the positive electrode layer further comprises at least one of a conductive agent, a binder, and a lithium-ion conductive sulfide, the lithium-ion conductive sulfide including at least one element selected from a group consisting of Al, Si, Fe, Ni, and Zr, and the total content of the at least one element in the lithium-ion conductive sulfide being 0.03% by mass or more and 0.3% by mass or less.

11. The battery pack of the claim 3, further comprising an external power distribution terminal and protective circuit.

12. The battery pack of the claim 3, comprising plural solid electrolyte secondary batteries, each of the solid electrolyte secondary batteries being the solid electrolyte secondary battery according to claim 8 the solid electrolyte secondary batteries being electrically connected in series, in parallel, or in series and in parallel.

13. A vehicle comprising the battery pack according to claim 3.

14. The vehicle of claim 13, wherein the battery pack is configured to recover a regenerative energy of a power of the vehicle.

* * * * *